Dec. 9, 1969  T. E. BELINA  3,482,330
INSTRUCTION SIMULATOR
Filed June 6, 1967
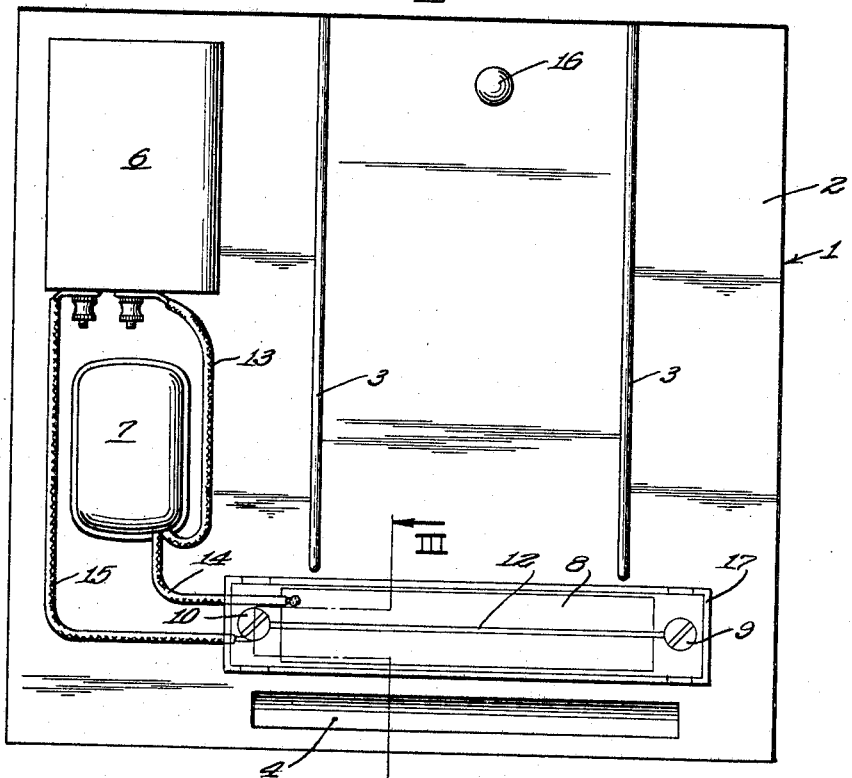
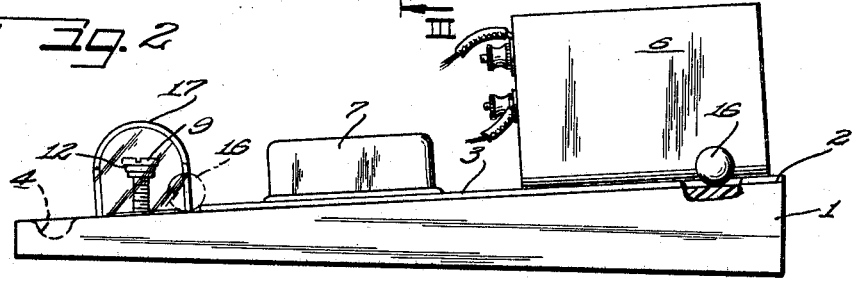
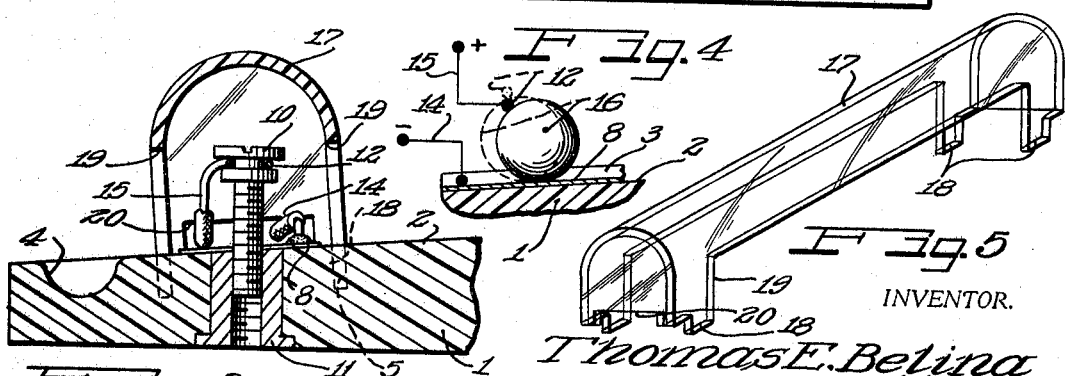
INVENTOR.
Thomas E. Belina
BY
ATTORNEYS

United States Patent Office 3,482,330
Patented Dec. 9, 1969

3,482,330
INSTRUCTION SIMULATOR
Thomas E. Belina, Evanston, Ill., assignor to Harper & Row, Publishers, Incorporated, Evanston, Ill., a corporation of Illinois
Filed June 6, 1967, Ser. No. 643,987
Int. Cl. G09b 23/06; A63h 33/26
U.S. Cl. 35—19                    4 Claims

ABSTRACT OF THE DISCLOSURE

A simulator for educational purposes to visually depict to a student salient components and the invisible action taking place in a detector of ionizing radiation, and including a traveling object to simulate a radiated particle and close an electrical circuit to energize an audible signal.

BACKGROUND OF THE INVENTION

Field of the invention

This invention or discovery relates to a simulator for educational purposes, and more particularly to a simulator of simple construction highly desirable for demonstrating the general performance and operation of a Geiger-Muller counter, generally referred to as a Geiger counter. As will be apparent to one skilled in the art the simulator could also be used for demonstrating the operation of other apparatus or scientific principles of lesser complexity.

DESCRIPTION OF THE PRIOR ART

Simulators have been heretofore made and used in the fields of display, toys, pyrotechnics, velocipedes, and also for educational purposes. Most simulators are made for a specific purpose. However, insofar as the knowledge of applicant is concerned no simulator has been produced that could adequately present the performance and operation of a Geiger counter even to a young student as well as to adult students.

SUMMARY OF THE INVENTION

The instant invention embodies an extremely simple form of apparatus, highly durable, easily transported, and accurate in its functioning. The apparatus is capable of indicating even to a very young student the general performance of a Geiger counter and with a relatively simple explanation of the characteristics and structure of an actual Geiger counter, the student is made well aware of the functioning of such a device. In the instant invention, a conductive ball acts as a radiated nuclear particle such as a beta particle to close a circuit between two electrodes representative of the anode and cathode of a Geiger counter and thus actuates a buzzer. Since the invention is mainly sold to public schools and other institutions of learning, economy is an essential, and that desideratum is fully satisfied by the instant invention. Another object fully satisfied by the instant invention is the provision of a device which so simply and clearly demonstrates the principles of a Geiger counter and physically shows to the student the nature of the invisible action taking place in a Geiger counter thus rendering it possible to explain the intricacies of a Geiger counter in an easily understood manner.

BRIEF DESCRIPTION OF THE DRAWING

FIGURE 1 is a top plan view of a simulator embodying principles of the instant invention;

FIGURE 2 is a side elevational view of the structure of FIGURE 1 taken from the right-hand side of FIGURE 1;

FIGURE 3 is an enlarged fragmentary transverse vertical sectional view taken substantially as indicated by the line III—III of FIGURE 1; and FIGURE 4 is an enlarged fragmentary vertical sectional view illustrating the closing of the electrical circuit by the travelling ball; and FIGURE 5 is a perspective view of the protective housing over the electrodes of the device.

DESCRIPTION OF THE PREFERRED EMBODIMENT

The illustrated embodiment of the instant invention embodies a base 1 so constructed that the upper surface 2 thereof slopes from one end of the base toward the other sufficiently for a ball when placed near the high end of the base to roll by gravity toward the lower end. The particular angle of slope is not critical, but a slope approximating 5° to the horizontal has proven quite satisfactory. The base may be made of wood, glass, molded from a suitable plastic, or any other suitable material. On the upper surface 2 thereof, the base is provided with a pair of spaced upstanding longitudinally extending ribs 3—3 which function to maintain the ball travelling in the proper direction even if carelessly placed on the base. Inwardly of the ditch 4 the base is provided with a number of properly spaced apertures or recesses to function as sockets 5, FIGURE 3, for the reception of the feet of the electrode housing.

Mounted on the base in any suitable location outside the path defined by the ribs 3—3 is a source of electricity such as a battery 6. Also mounted on the base is a known form of electrical buzzer 7 of the same voltage as the battery, such as a six volt buzzer energized by a six volt battery, for example.

Also mounted on the base is an elongated flat strip or sheet of thin conductive material such as copper, brass, aluminum or any other sutiable material. This strip 8 extends entirely across the lower end of the space defined between the ribs 3—3. Adjacent the ends of the strip 8, but out of contact therewith, are upstanding conductive studs 9 and 10, adjustable as to height, by way of each being threaded into a fixed nut 11 (FIGURE 3) in the base. Spaced above the strip 8 and carried by the upper ends of the studs 9 and 10 is a conductive wire 12, a piano wire being satisfactory for the purpose.

To establish a suitable electrical circuit, one terminal of the battery 6 is connected by a conductor 13 to one side of the buzzer 7, the other side of the buzzer being connected by a conductor 14 to the conductor strip 8. The other battery terminal is connected by a conductor 15 to the top of the stud 10 and thus to the wire 12. The circuit is thus normally open between the wire 12 and the strip 8.

The circuit is closed by means of a freely travelling conductive element which may slide or roll down the base between the ribs 3—3, a ball bearing 16 being quite satisfactory for this purpose. With reference to FIGURE 4, it will be seen the wire is adjusted by way of the studs 9 and 10 to a height slightly less than the diameter of the ball 16. The wire is under sufficient tension to delay the movement of the ball as it passes between the wire and the strip 8 for a fraction of a second so as to insure good contact of the ball with both the wire and the strip to close the circuit and obtain an audible zip from the buzzer 7. As indicated by dotted lines in FIGURE 4 the wire 12 may flex vertically sufficiently for the ball to pass therebeneath and travel to the ditch 4 after the slight contact insuring delay.

An elongated dome-like transparent plastic housing 17, seen best in FIGURE 5, is positioned over the wire, studs 9 and 10, and strip 8. The housing is provided with feet 18 thereon which enter the sockets 5 in the base. On each side thereof there is an elongated notch 19 in the housing of sufficient height to permit passage of the ball through the housing, and at one end thereof the housing is notched as at 20 to permit entrance of the conductors 14 and 15.

In general, a Geiger counter embodies a gas, such as argon, held in an envelope of thin soda glass or other equivalent material between two electrodes. In a cylindrical external cathode Geiger counter, the cylindrical electrode is the cathode and is external to the gas envelope. The other electrode, the anode, is a fine wire stretched along the axis of the cylinder centrally through the gas envelope. When an atom of the gas between the two electrodes is ionized by collision with a charged particle, such as a beta particle, passing through the gas, the electron produced in the collision is drawn toward the central wire upon which a potential has been placed. The electron collides with the atoms of the gas and near the central wire the electric field is very intense, and the electron may acquire enough energy between two collisions to allow it to ionize another atom whereby a second electron is set free and by successive collisions, an avalanche of electrons is produced which is then collected as charge on the central wire. The charge produces an electrical impulse. The impulses emanating from the counter are amplified electronically and are then counted by an electromechanical register or as clicks in a loudspeaker.

With such a counter in mind, it will be seen that with the instant invention the strip 8 represents the cathode of a counter and the wire 12 represents the anode, while the ball may be said to represent a radiated particle such as a beta particle which enters and travels through the gas envelope, simulated by the housing 17. The battery 6 simulates the means for placing a potential upon the anode or central wire, and the buzzer 7 simulates the loudspeaker of a counter.

Accordingly, with a simple explanation of the components of a Geiger counter and the parts of the instant simular corresponding thereto, it is a simple expedient for the instruction or student to place a ball or a plurality of balls in succession on the top face 2 of the base near the higher end thereof and permit the balls to gravitate down between the ribs 3—3 and thus energize the buzzer. Whereupon, even a very young student would acquire quick and accurate knowledge of the general principles and operation of a Geiger counter. With the visual and audible help of the simulator the student becomes acquainted with a Geiger counter in a minimum time and with a minimum amount of effort on the part of the instructor.

It will be understood that modifications and variations may be effected without departing from the scope of the novel concepts of the present invention.

I claim:
1. A simulator for educational purposes to explain to a student by visible means the components and invisible action taking place in a detector of ionizing radiation, comprising
   a sloping base having a smooth upper surface,
   guiding means on said surface defining a fixed path of travel thereover,
   a conductive member in the form of a flat strip on said base extending across said path adjacent the lower end thereof,
   a second conductive member in the form of a wire extending above said strip and spaced therefrom,
   vertically adjustable means supporting said wire,
   an electrical circuit normally open by virtue of the spacing of said conductive members,
   means in said circuit responsive to the closing of the circuit to emit an audible signal,
   a conductive member freely movable by gravity along said path and capable of closing said circuit when passing between said vertically spaced conductive members,
whereby any such gravity movable conductive member traveling over said surface must follow said path without deviation to and between said spaced conductive members.
2. The simulator of claim 1, wherein said freely movable member is a ball and the space between said strip and wire is slightly less than the diameter of said ball,
   said wire flexing to permit passage of said ball after slightly delaying the same to insure closing of said circuit momentarily between said wire and strip.
3. The simulator of claim 2, including
   a housing enclosing said wire and strip and having notches in the sides thereof to permit passage therethrough of said ball.
4. The simulator of claim 3, wherein
   said ball simulates a radiated particle,
   and said housing, wire, strip and signal emitting means correspond respectively to the gas envelope, the anode, the cathode, and the loudspeaker of a Geiger-Muller counter.

References Cited

UNITED STATES PATENTS

| | | | |
|---|---|---|---|
| 1,707,859 | 4/1929 | Johnson | 273—86 |
| 2,004,981 | 6/1935 | Firestone | 273—121 |
| 2,025,823 | 12/1935 | Raptke | 273—121 |
| 2,098,872 | 11/1937 | Krippner | 235—98 |
| 2,247,095 | 6/1941 | MacDougall | 273—127 X |
| 2,477,115 | 7/1949 | Clark | 35—19 |
| 2,581,693 | 1/1952 | Mumma | 235—98 |
| 3,348,844 | 10/1967 | Lemelson | 273—121 |

EUGENE R. CAPOZIO, Primary Examiner

H. S. SKOGQUIST, Assistant Examiner

U.S. Cl. X.R.

46—232; 235—98